United States Patent Office 3,135,980
Patented June 9, 1964

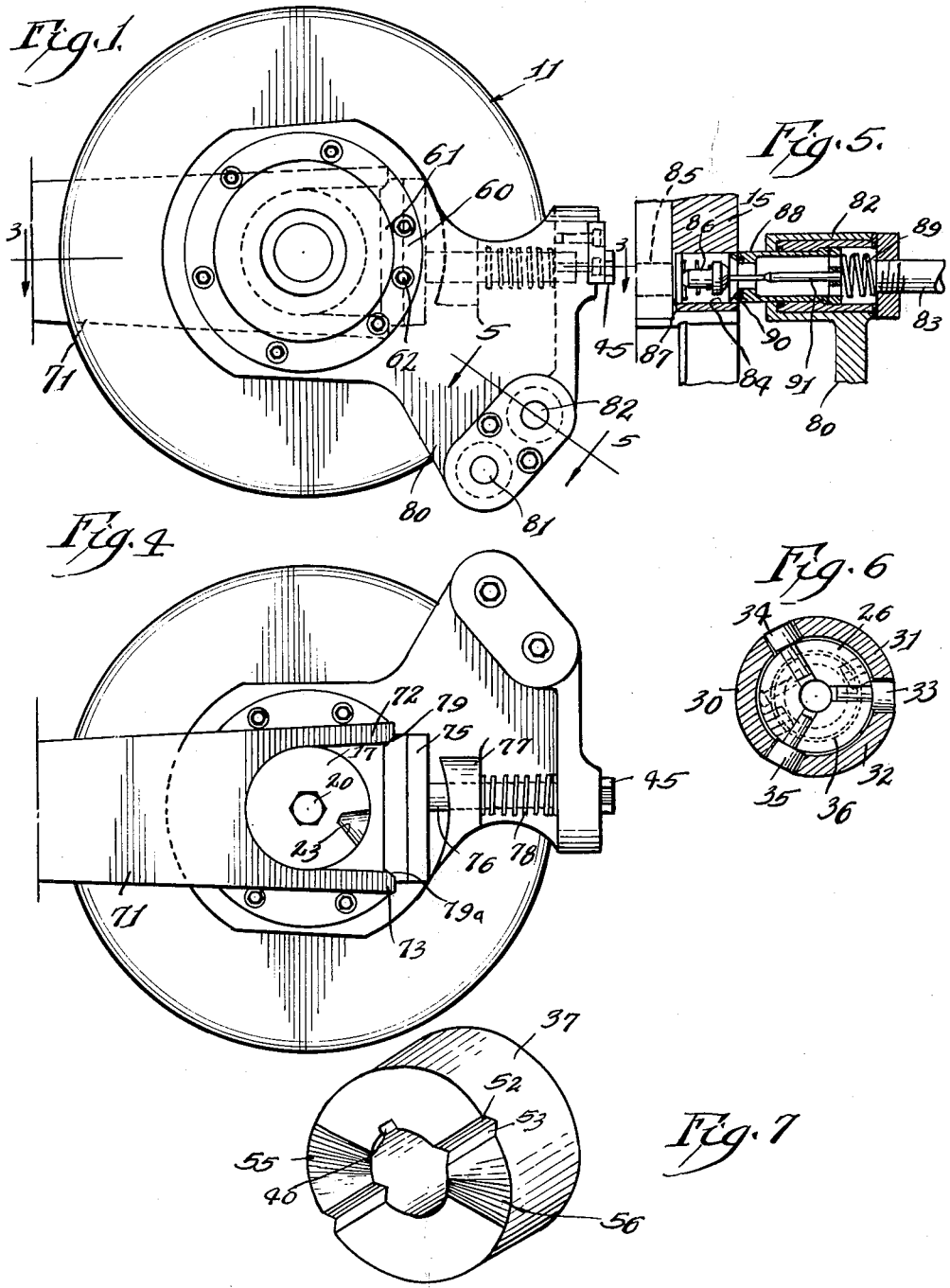

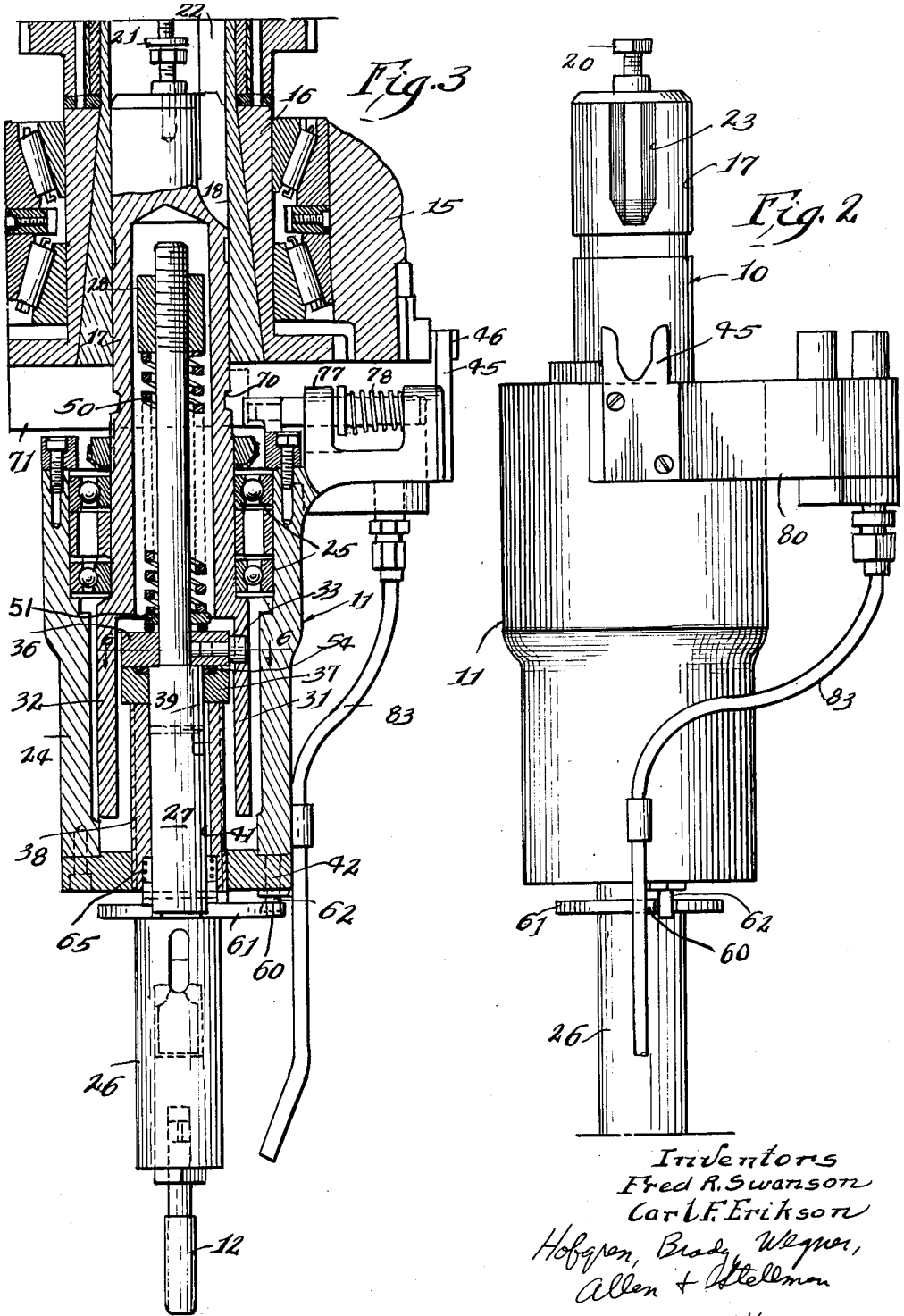

3,135,980
TOOL SUPPORTING ADAPTER HAVING MEANS TO COACT WITH A TRANSPORT MEANS FOR ORIENTATION OF THE ADAPTER WITH THE SPINDLE HEAD
Fred R. Swanson, Rockford, and Carl F. Erikson, Belvidere, Ill., assignors to Sundstrand Corporation, a corporation of Illinois
Continuation of application Ser. No. 71,594, Nov. 25, 1960. This application Aug. 16, 1963, Ser. No. 306,979
1 Claim. (Cl. 10—129)

This invention relates to tool supporting, handling and driving adapters in which certain parts associated with the adapter require accurate positional control during use of the adapter.

An object of this invention is to provide a new and improved tool adapter.

Another object of this invention is to provide a new and improved tool adapter having means associated therewith which are held against movement during operation of the tool.

A further object of the invention is to provide a tool adapter in combination with a machine tool having a head with a spindle with the adapter having a body insertable in the spindle bore and having parts requiring a predetermined fixed relation to the spindle with coacting means on the head and parts supported by the adapter body for alignment therebetween and holding of said parts stationary relative to the head.

A further object of the invention is to provide a combination as defined in the preceding paragraph in which adapter handling means are provided for insertion and removal of an adapter from the spindle and said parts and adapter handling means have coacting abutments whereby said parts are held in oriented relation when the adapter is associated with said handling means.

A further object of the invention is to provide an adapter and lead screw tapper combination comprising an adapter body, a frame mounted on said body for movement relative thereto and adapted for being held against movement, a nut and coacting lead screw with one affixed to said frame and the other rotatable with the adapter body, and means yieldably urging a tool to follow the relative advance of the lead screw and nut whereby rotation of the adapter body causes yieldable advance of a tool.

Further objects and advantages will become apparent from the following detailed description taken in connection with the accompanying drawings in which:

FIG. 1 is an end elevational view of the adapter with the adapter handling means shown in association therewith and broken away;

FIG. 2 is a plan view of the adapter turned 90° from the position shown in FIG. 1;

FIG. 3 is a horizontal section of the adapter shown in FIGS. 1 and 2 shown in association with the machine tool head and spindle in section and with the adapter handling means shown in broken lines;

FIG. 4 is an end elevational view of the adapter taken of the end opposite from that shown in FIG. 1;

FIG. 5 is a fragmentary section taken generally along the line 5—5 in FIG. 1 of the adapter and showing parts of the adapter in association with the machine tool head;

FIG. 6 is a fragmentary section taken generally along the line 6—6 in FIG. 3; and FIG. 7 is a perspective view of a cam member shown in section in FIG. 3.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

This application is a continuation of application Serial No. 71,594, filed November 25, 1960, now abandoned.

As shown in the drawings, the adapter embodies a body 10 having a frame 11 rotatably mounted on the body 10 for movement relative to each other in operation and use of a tool 12 associated with the adapter. The adapter body 10, as shown in FIGS. 2 and 3 and in association with a machine tool head 15 and spindle 16 in FIG. 3, has a cylindrical section 17, which is receivable in a collet 18 within the spindle 16. The extent of movement of the adapter body 10 into the spindle 16 is determined by the abutment of a threaded member 20 adjustably mounted at an end of the adapter body engaging with an abutment 21 mounted within the bore of the spindle 16. Additionally, the spindle has a key 22 which engages in a keyway 23 of matching shape in the adapter to provide maximum driving torque for the adapter body 10.

The adapter embodying the invention herein is one in which a part thereof must have a predetermined relation to the head 15 and spindle 16 during operation of the tool and one particular form of such an adapter is disclosed herein as a combination of adapter and lead screw tapper. In the lead screw tapper, the frame 11 is hollow and has an annular wall 24 which is rotatably mounted on the adapter body 10 by means of bearings 25.

The tool 12 is connected to a socket 26 at an end of a shaft 27 which extends upwardly into a hollow chamber within the adapter body 10 and has a nut 28 threaded on an end thereof.

The tool 12 is rotated by connection to and rotation with the tool adapter body 10 which derives its rotation from the spindle 16. More particularly, the adapter body 10 has an end thereof remote from the depth-determining member 20 and divided into three circumferentially spaced sections, 30, 31, and 32, as viewed in FIG. 6, between which are received rollers 33, 34, and 35 carried by a cam member 36 which is loosely mounted on the shaft 27. The cam member 36 through cam engagement with a cam member 37, as more fully described hereinafter, causes rotation of a lead screw 38 by means of a key 39 fastened to the shaft 27 and received in a keyway 40 of the cam member 37, as shown in FIG. 7, and a corresponding keyway 41 in the lead screw 38. This rotation of the shaft 27 results in rotation of the tool 12 and additionally the rotation of the lead screw causes advance of the tool 12 by advance of the lead screw in a nut 42 suitably affixed to an end of the adapter frame wall 12.

It will be seen that the nut 42 must remain stationary for the tool 12 to operate and this is accomplished by having a forked member 45 on the adapter frame 11 which, as shown in FIG. 3, engages a pin 46 on the machine tool head 15 to hold the adapter frame 11 stationary. The engagement between the fork 45 and the pin 46 is obtained as the adapter is inserted into the spindle 16.

The lead screw tapper has a yieldable drive to limit the torque applied to the tool and this embodies a spring 50 seated between the nut 28 threaded on shaft 27 and a thrust ball retainer 51, to maintain the cam members 36 and 37 in engagement with the cam member 36 being limited in its movement by abutment with a shoulder on the shaft 27. The cam member 37 as shown in FIG. 7 has a pair of depressions with 45° cam surfaces 52 and 53 for engagement by correspondingly shaped cam projections 54 on the cam member 36. Additionally, the cam member 37 has surfaces 55 and 56 sloping downwardly toward the cam depressions. With this construction, the cam member projections 54 can readily seat themselves in the cam depressions in cam member 37 after the cam members have been disengaged. In a tapping operation when the torque exceeds the limit imposed by the tension on the spring 50, the cam surfaces on the members 36 and 37 will rotate relative to each other since they disengage and compress the spring to allow the cam member 37 to stop rotating which stops rotation and advance of the tool 12.

In operation, with the adapter in position relative to the spindle, rotation of the tool adapter body 17 through cam members 36 and 37 results in rotation of the tool 12 as well as the lead screw 38. After completion of the tapping operation, the rotation of the adapter body 17 is reversed to retract the tool 12 and this operation continues until a lug 60 on a plate 61 attached to the shaft 27 hits a nut 62 to stop rotation of the shaft 27 and additional rotation of the adapter body 10 causes the cam members 36 and 37 to disengage.

In the event no drilled hole is present when the tool 12 strikes a wall of the object being machined, the lead screw 38 can continue to advance by compressing a spring 65 disposed between the lead screw 38 and a shoulder on the shaft 27. This allows the cam members 36 and 37 to move away from each other to disengage the drive to the shaft 27 and lead screw 38.

In order to facilitate automatic handling of the adapter, the adapter body 17 has a peripheral handling groove 70, as shown in FIG. 3, to facilitate grasping thereof by adapter handling means shown partially in FIGS. 1, 3 and 4 and embodying an arm 71 having a forked end with arms 72 and 73 disposable in the groove 70, the adapter handling means being generally of the type disclosed in the copending application of Fred R. Swanson and Carl F. Erikson, filed September 29, 1960, Serial No. 59,236.

In order to insure engagement between the forked member 45 on the adapter frame 11 and the pin 46 on the machine tool head, the frame 11 is maintained at all times in controlled orientation by having a plunger 75 affixed to a stem 76 slidable in a bracket 77 and urged toward the member 71 by a spring 78. This plunger 75 has a pair of abutments 79 and 79a which engage the ends of the forked arms 72 and 73 to hold the adapter frame 11 against rotation.

An added feature of the adapter is the supplying of a fluid, such as air or coolant, to a point adjacent the tool 12 with connections automatically being made by association of the adapter with the machine. This is accomplished by having a shoulder 80 on the adapter frame 11 which is provided with a pair of individually usable quick-connect couplings 81 and 82 with a pipe 83 connected to one of these couplings as shown in FIGS. 2 and 3 and the coupling 82 shown in detail in FIG. 5. The head 17 has a fluid outlet 84, receiving a fluid through a passage 85 having a check valve 86 urged to a closed position by a spring 87. The coupling embodies a sleeve 88 which is spring-urged toward the head by a spring 89 to engage and seal the head by an O-ring 90. At the same time, a stem 91 is engaging the check valve 86 to open the outlet 84, so that subsequent supplying of fluid through the line 85 will result in passage thereof through the coupling to the pipe 83 for supply and use at a point adjacent the tool 12.

We claim:

In combination, a machine tool having a spindle head with a rotatable spindle having a bore, a tool transport mechanism for handling a tool for positioning thereof relative to a spindle, an adapter and tool combination in which an adapter body has a stem positionable in said spindle bore and a part of the tool includes a frame movable relative to the stem and having a position of proper alignment relative to said stem, said adapter having a working position with the stem in the spindle, mating means on the spindle head and frame for holding the frame stationary relative to the stem, said mating means requiring alignment of the frame relative to the spindle head for mating thereof upon insertion of said stem into the spindle bore, coacting means on the transport mechanism and adapter stem for transport of the adapter, and additional coacting means on the transport mechanism and frame holding the frame in fixed position during transport of the tool and adapter to have said mating means in alignment upon mounting of the adapter in the spindle.

References Cited in the file of this patent

UNITED STATES PATENTS 3,052,011     Brainard et al. _____ Sept. 4, 1962

OTHER REFERENCES

American Machinist, pages 106–108, Sept. 14, 1944.